Aug. 31, 1965    J. C. GARRETT    3,203,651
SAFETY APPARATUS FOR VOLATILE FUEL
Filed Jan. 24, 1962    2 Sheets-Sheet 1
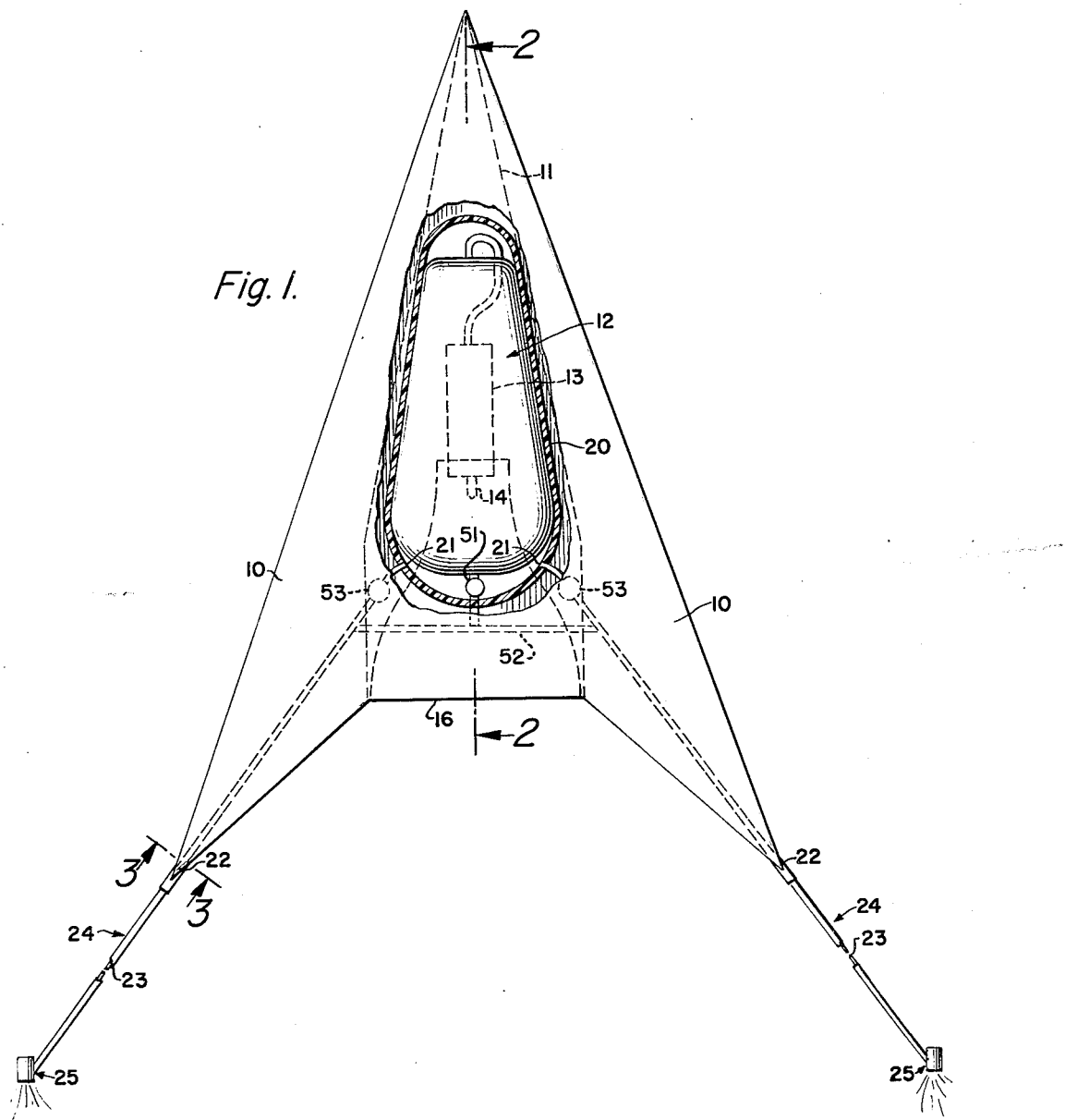
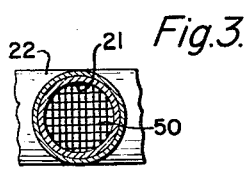
INVENTOR:
JOHN C. GARRETT,
BY
. Agent.

Aug. 31, 1965   J. C. GARRETT   3,203,651
SAFETY APPARATUS FOR VOLATILE FUEL
Filed Jan. 24, 1962   2 Sheets-Sheet 2
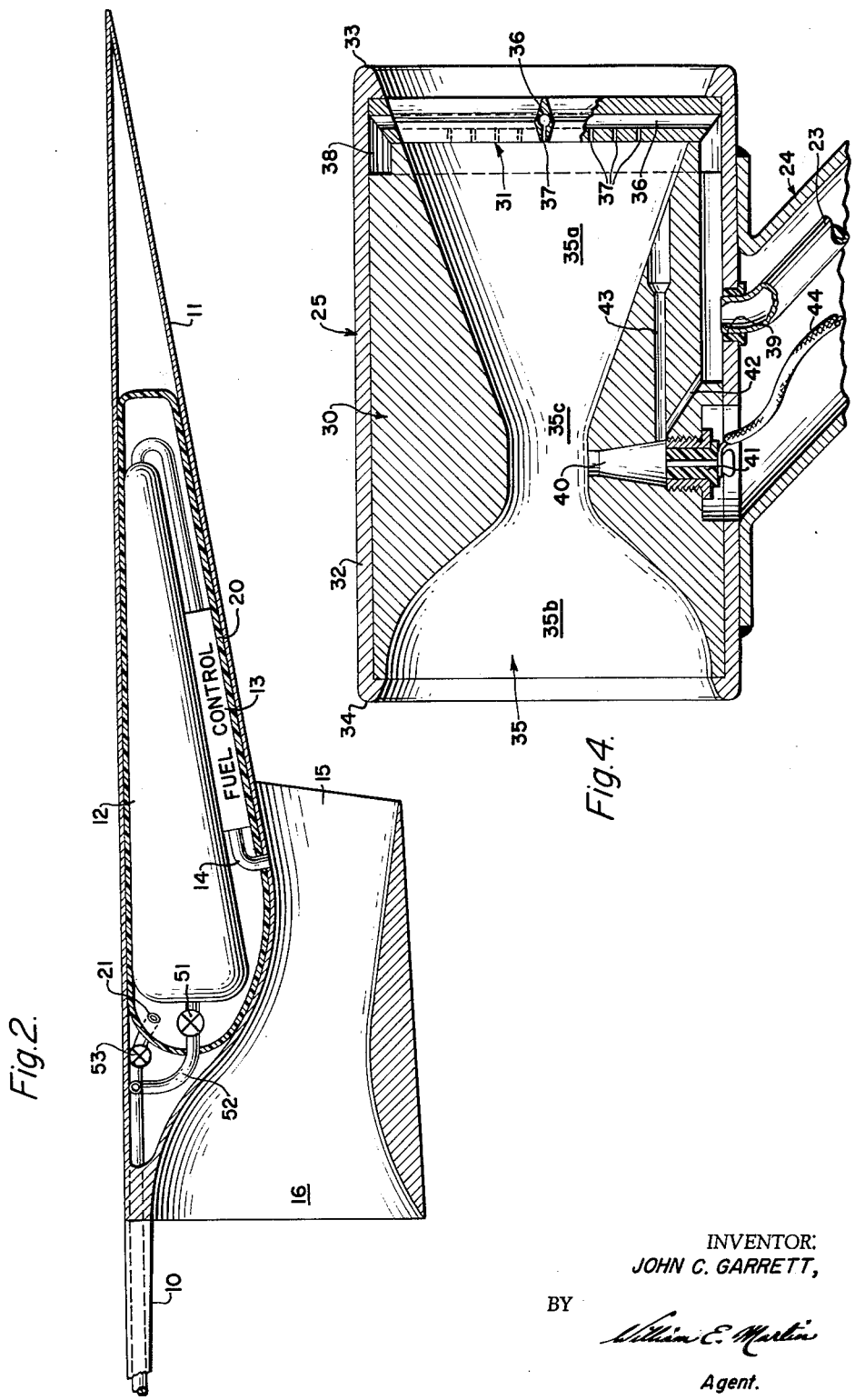
INVENTOR:
JOHN C. GARRETT,
BY
*William E. Martin*
Agent.

United States Patent Office 3,203,651
Patented Aug. 31, 1965

3,203,651
SAFETY APPARATUS FOR VOLATILE FUEL
John C. Garrett, Beverly Hills, Calif., assignor to The Garrett Corporation, Los Angeles, Calif., a corporation of California
Filed Jan. 24, 1962, Ser. No. 168,423
1 Claim. (Cl. 244—58)

This application relates to apparatus for use in conjunction with a heat engine adapted to burn a volatile fuel and, more particularly, to means for conducting leakage away from the fuel system of such an engine to a point located remotely thereof so that said leakage may be safely disposed of without hazard to enclosures in which said engine and fuel system may be housed.

In connection with reaction propulsion engines as well as other types of power plants for use in vehicular applications, it is advantageous to employ a volatile fuel having the highest possible heat of combustion per unit of fuel weight; by this means an optimum ratio of the weight of fuel carried to the useful heat energy derivable therefrom may be obtained, and the operating range of the associated vehicle may be concomitantly increased. For these reasons, it has been found advantageous to use hydrogen as a fuel for such power plants, the chemical fuel value of hydrogen, as measured in B.t.u. per pound or other convenient units, being the highest of any known combustile fuel. As is well known, however, hydrogen is a highly reactive element and, because of the small size of its molecule, is relatively difficult to contain. Further, since it is advantageous, from a standpoint of achieving a desirable economy of volume, to store hydrogen at the highest possible density, such as is achievable only at extremely low or so-called cryogenic temperatures, thermal expansion and contraction of the tankage and plumbing whereby the hydrogen fuel is supplied further compound the problem of leakage.

As will be apparent from the foregoing considerations, the use of hydrogen as a fuel presents problems of containment and leakage which may entail substantial hazard not only to the integrity of a power plant adapted to use such fuel but also to personnel concerned in the operation thereof. It is one aim of the present invention, therefore, to mitigate this hazard by providing an auxiliary envelope for containment of hydrogen leakage and means cooperative therewith for conducting the leakage so contained to a location where it may be safely disposed of by burning or dispersion in the ambient atmosphere. Thus, through the use of the invention as taught herein, accumulation of hydrogen in the engine or fuel system enclosure in such concentration as to form an explosive mixture therein is effectively circumvented, and the hazard which would otherwise be associated with the operation of such a power plant is substantially mitigated.

In order to accomplish the aforementioned aim of the invention, it is proposed to enclose those portions of a hydrogen fuel supply system, wherein leakage is anticipated, in a relatively flexible envelope or sac comprising a membrane of material impermeable to hydrogen, the leakage captured by the enclosing envelope being conducted via suitable passages to a point or points where it may be safely burned or otherwise disposed of without hazard to the power plant or its operators. Thus, in a preferred form of the invention as disclosed herein for use in a supersonic aircraft of the type described in copending application, Serial No. 119,154 of Robert A. Gross, Skillman C. Hunter and Leslie W. Norman, filed June 23, 1961 and entitled Method and Apparatus for Reaction Propulsion, a rigid thermally insulated tank for the storage of hydrogen at cryogenic temperatures is surrounded with an enveloping sac, which may, for example, be of plastic material, impregnated textile fabric or the like. Leakage accumulated in the enveloping sac is conducted therefrom, via suitable passages, to a pair of symmetrically disposed booms whereby the leakage flow path may be extended outwardly of the normal limits of the airframe, the outwardly extending ends of the booms preferably incorporating suitable burners whereby the hydrogen leakage conducted thereto may be burned in the ambient atmosphere. In order to prevent flashback from the burners to the interior of the enveloping sac, heat conductive safety screens are incorporated in the ducts intermediate the ends thereof. In a preferred embodiment of the invention, the projecting booms whereby the hydrogen leakage path is extended outwardly of the air-frame are made so as to be jettisonable, if desired, at such time, for example, as the aircraft has become airborne and achieved sufficient speed to dispel the hazard of fire or explosion due to accumulation of hydrogen in the circum-ambient atmosphere. Since it is anticipated, however, that the aircraft may achieve a speed equal to or greater than that at which the stagnation temperature equals the ignition temperature of hydrogen, it is contemplated that heat conductive safety screens, as hereinbefore mentioned, be positioned terminally of the inboard hydrogen passages, thereby to prevent flashback to the aircraft interior from combustion which may occur spontaneously as a result of either aerodynamic heating or the accumulation of electric charge on the aircraft surface.

It is, therefore, a primary object of the present invention to provide means for the collection and safe disposition of combustible vapor in a power plant system adapted to consume a volatile fuel such as hydrogen.

It is another object of the invention to provide means for combustion of hazardous vapor, which may be collected in a flexible, impermeable envelope enclosing a fuel system as hereinbefore described, without danger to adjoining structure or personnel.

It is still another object of the invention to provide a structure wherein hazardous vapor collected in a flexible envelope enclosing portions of a fuel system may be conducted to burners located remotely thereof, the vapor conduction paths being provided with suitable screens to prevent flashback from the burners to the interior of the envelope.

It is another object of the invention to provide a structure as described in the foregoing paragraph wherein the burners are jettisonable.

The manner in which it is proposed to accomplish these and other objects may be better understood by reference to the accompanying drawings which are merely illustrative of a preferred practice of the invention. In the drawings, wherein like elements are designated by like reference numerals:

FIG. 1 is a plan view, partially broken away, of an aircraft embodying the invention;

FIG. 2 is a longitudinal section taken along the line 2—2 of the aircraft shown in FIG. 1;

FIG. 3 is a cross-section taken along the line 3—3 of FIG. 1; and

FIG. 4 is a longitudinal section of a combustor for use with the invention.

Referring to FIG. 1, there is illustrated an aircraft of a type adapted for flight at hypersonic Mach number as disclosed, for example, in copending application, Serial No. 127,369 of Archibald P. Kelley and Leslie W. Norman, filed July 27, 1961, and entitled Improvements in Engines. As shown in the drawing, the aircraft comprises a wing or airfoil surface 10 of substantially sagittal planform, a central enlargement or fuselage 11 appended to the lower surface of the wing 10 and extending axially thereof, a fuel tank 12 housed internally of fuselage 11, and a fuel control system 13 whereby fuel may be metered in accordance with a desired flight condition for delivery via suitable conduit means 14 to a propulsive aerothermodynamic duct 15 having a rearwardly directed exhaust nozzle 16. The duct 15 is preferably of the type wherein continuous detonation of a fuel-air mixture is excited by means of a standing aerodynamic shock wave therein, the fuel of choice for combustion in such a duct being hydrogen. In order to provide for the accommodation of a maximum weight of fuel within the limited space available for the fuel tank 12, hydrogen is preferably stored cryogenically therein, for example, at a temperature below 50° R., thereby to secure the advantage of increased density which characterizes condensation of hydrogen from the usually encountered gaseous phase. It will be understood, of course, that in order to maintain the desired cryogenic temperature therein, the tank 12 may preferbly comprise a double wall construction of the Dewar type having an evacuated or otherwise suitably insulated intermural space to oppose transfer of ambient heat to the contained hydrogen. For introduction to the fuel control system 13 and the aerothermodynamic duct 15, it is desirable that the cryogenically stored hydrogen be progressively re-converted to the gaseous phase in accordance with the demand therefor, and for this purpose heat may be transferred to the interior of the fuel tank 12 at an appropriately controlled rate, such transfer being accomplished by any suitable means as taught in the prior art.

In the storage of hydrogen fuel at cryogenic temperature for progressive reconversion to the gaseous phase and introduction to a heat engine, severe temperature and pressure gradients may be developed in various portions of the fuel storage and supply apparatus, and these gradients, when coupled with the small dimension of the hydrogen molecule, render the problem of containment extremely difficult. As will be apparent to those skilled in the art, this difficulty may combine with the highly reactive nature of hydrogen to present a real and formidable danger of fire or explosion in a vehicle of the type herein contemplated. For this reason, the present invention provides an impremeable envelope 20, which may preferably be of flexible or distensible construction, for enclosing the fuel tank 12, the fuel control system 13 and the fuel delivery conduit 14 to capture any leakage therefrom and to prevent the same from finding its way into any region of the aircraft wherein the local temperature may exceed the ignition temperature or flash point of hydrogen. the envelope 20 may preferable be formed of plastic film (for example polyethylene terephthalate, sold by E. I. du Ponte de Nemours, Inc. under the trademark "Myler"), impregnated textile farbic or other material conformable to the external contours of the structure to be enclosed and capable of retaining a desired degree of flexibility throughout a relatively wide temperature range.

Hydrogen captured by the envelope 20 may be ducted to the exterior of the aircraft by means of suitable passages 21 which may, for example, provide flow paths to wing tips 22 whence the leakage may, if desired, be conveyed still further outboard by supplementary passages 23 housed in outwardly cantilevered booms 24. The booms 24 may preferably be attached to the wing tips 22 in removable or jettisonable manner; thus, when the aircraft has achieved a flight condition at which the velocity of relative airflow is sufficient to dispel any fire hazard due to accumulation of an explosive mixture circumambient thereto, the booms 24 may be jettisoned to reduce both the weight and aerodynamic drag of the aircraft. In order to dispose of the hydrogen conveyed outboard of the aircraft via the booms 24 without incurring an undesirable fire or explosion hazard in the immediate region thereof, the booms may preferably be provided with terminal combustors 25 as more clearly illustrated in FIG. 4.

Referring to FIG. 4, which is a longitudinal section through a combustor 25 exemplifying a preferred mode of construction, there is shown a cylindrical assembly which comprises an annular body member 30 and a hydrogen injection grid 31 enclosed in a tubular housing 32, the respective elements being retained in assembled position as by spun-over ends 33, 34. The body member 30 defines a combustion space 35 having a forwardly directed intake cone 35a, a rearwardly directed exhaust nozzle 35b, and an intermediate throat 35c. The injection grid 31, whereby hydrogen is introduced into the space 35 for combustion therein, is provided with transverse flow passages 36 for conducting hydrogen to rearwardly directed injection orifices 37, the forward portion of body member 30 being of reduced external diameter to provide a peripheral channel or manifold 38 affording flow communication between hydrogen inlet port 39 and the passages 36.

In order to establish and maintain combustion of hydrogen in the space 35, a pilot flame is injected into the throat 35c by means of an ignition chamber 40 having an igniter 41 disposed therein. Hydrogen drawn from the inlet port 39 is conducted to the ignition chamber 40 via a metering passage 42, the latter being angularly disposed relative to an air metering passage 43 so as to permit the hydrogen flow to exercise an aspirator or jet pump effect whereby a desired air flow from the intake cone 35a to the ignition chamber 40 may be induced even under a condition of no ambient flow relative to the cumbustor 25. The igniter 41 is here shown, for illustrative purposes only, as comprising a surface ignition spark plug of a type well known in gas turbine and turbojet engine practice, an electrical lead 44 being conducted thereto, via the boom 24, from a suitable power supply aboard the aircraft. It is to be understood, however, that alternate igniter means, such as a glow plug, may of course be used for the same purpose. Also, it is contemplated that under certain flight conditions it may be possible to maintain combustion by aerodynamic means alone, and for this purpose the interior contour of the combustion space 35 is shaped so as to support a standing detonation wave substantially as taught in the hereinbefore mentioned co-pending application Serial No. 119,154 of Gross et al. To prevent flashback from the combustors 25 along the ducts 23 to the interior of the aircraft, inboard passages 21 are provided with safety screens 50 disposed transversely of the hydrogen flow path, as more clearly shown, for example, in FIG. 3.

Since operational fuel consumption requirements of the aerothermodynamic duct 15 may not at all times be compatible with the thermodynamic characteristics of the storage tank and means for converting the hydrogen stored therein to the gaseous phase, the fluid pressure internally of the tank may at times exceed desirable limits. For this reason, there is provided a pressure relief valve 51, which may be of well known type and may, if desired, incorporate a suitable manual override mechanism whereby the tank pressure may be controlled at the discretion of operating personnel. Hydrogen released by the relief valve 51 to relieve excess fuel pressure in the tank 12 may be directed, for example by a suitable manifold 52, to the passages 21, whence it may be vented outboard of the aircraft as hereinbefore described with reference to hydrogen transpired due to leakage. Undesired inflation or pressurization of the flexible envelope 20, as a result of rapid release of a large volume of hydrogen via the relief valve 51, may be prevented by the provision of check valves 53 in the inlet portion of each of the lines 21, such valves being arranged to permit only outward flow from the envelope 20.

From the foregoing description thereof, it will be apparent that the present invention provides a simple, economical and light-weight apparatus for mitigating the danger of explosion which would otherwise be caused by fuel leakage and pressure relief in the environment of a power plant which is adapted to consume a highly volatile and reactive fuel such as hydrogen. Further, it will be apparent that the invention provides means for mitigating the aforementioned danger and disposing of hazardous vapors without prejudice to the control or operation of the power plant with which it is used. While the invention has been herein disclosed with reference to a particular embodiment adapted for use with an aircraft power plant, it is anticipated that variations thereon may be devised by those skilled in the art, and it is my desire that all such variations falling within the spirit and scope of the invention be secured to me by Letters Patent.

I claim:

In an aircraft having a propulsion system including a heat engine for burning a fuel, a storage tank for said fuel, and means for conducting fuel from said tank to said engine, the improvements comprising:

an envelope enclosing a portion of said system wherein fuel leakage is anticipated so as to define a fuel leakage space between said envelope and the portion of said system enclosed by the envelope;

a duct opening at one end of said space and having its other end terminating in a boom located outboard of the airframe of the aircraft so as to be situated in the airstream surrounding the aircraft during flight;

a combustor mounted on the outboard end of said duct including a housing having a combustion chamber opening through the forward and rear ends of the housing, whereby airflow occurs through said chamber during flight;

fuel injection means mounted in the open, forward end of said chamber and having a passage communicating with said duct and opening to said chamber, whereby fuel which leaks into said leakage space is conducted through said duct and passage to said chamber;

said chamber having a forward, rearwardly convergent intake portion terminating in a constricted throat, and a rearwardly divergent exhaust nozzle leading from said throat through the rear end of said housing, said intake portion being shaped to excite spontaneous detonation of leakage fuel entering said chamber under certain conditions of airflow through the chamber during flight;

an igniter mounted in said chamber behind said fuel injection means, whereby leakage fuel entering the chamber may be burned either by spontaneous combustion or by said igniter; and means releasably securing said one end of said boom to said airframe, whereby said boom and combustor may be jettisoned in flight.

References Cited by the Examiner

UNITED STATES PATENTS

| | | | |
|---|---|---|---|
| 2,757,362 | 7/56 | Gutkowski. | |
| 2,766,581 | 10/56 | Welsh | 60—35.6 |
| 2,835,109 | 5/58 | Longwell | 60—35.6 |
| 3,040,516 | 6/62 | Brees | 60—35.6 |
| 3,072,363 | 1/63 | Baumann | 244—1 |

SAMUEL LEVINE, *Primary Examiner.*

SAMUEL FEINBERG, *Examiner.*